Feb. 3, 1925.
E. KOVARY
ADJUSTABLE GRIPPING TOOL
Filed May 3, 1924
1,525,077
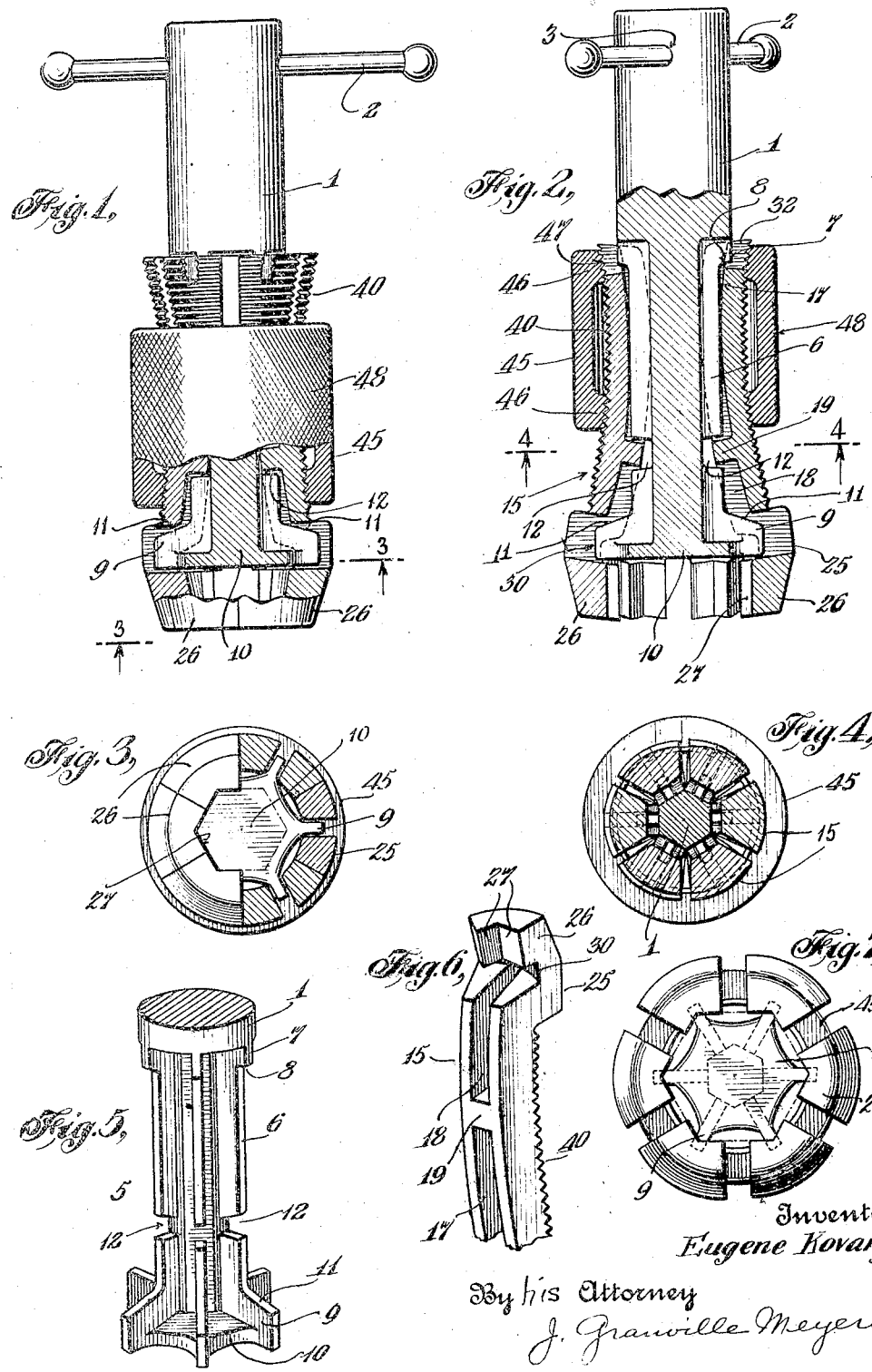
Inventor
Eugene Kovary
By his Attorney
J. Granville Meyers Patented Feb. 3, 1925.

1,525,077

UNITED STATES PATENT OFFICE.

EUGENE KOVARY, OF BROOKLYN, NEW YORK.

ADJUSTABLE GRIPPING TOOL.

Application filed May 3, 1924. Serial No. 710,846.

*To all whom it may concern:*

Be it known that I, EUGENE KOVARY, a citizen of the United States, and resident of Brooklyn, in the county of Kings and State of New York, have invented certain new and useful Improvements in Adjustable Gripping Tools, of which the following is a specification.

My invention relates to an implement designed specifically for use as a socket wrench, but which is also useful, with or without modifications, within the principles of the invention as herein disclosed, as a gripping implement for other purposes, such, for example, as a chuck or adjustable tool or implement holder.

The general object of the invention is to provide an adjustable gripping implement of the socket wrench or chuck type in which a sufficient number of grippers or jaws may be provided for any practical purpose for which such an implement is used; to provide a suitable mounting for the jaws which permits their proper adjustment and at the same time supports them with substantial rigidity against dislocation in various directions in any of their adjusted positions; to provide a new and improved adjusting structure or arrangement in connection with other features of the invention; and further, to provide an appliance embodying some or all of the above mentioned features and which is, at the same time, quite simple and therefore may be produced at moderate cost.

The characteristics and advantages of the invention are further sufficiently explained in connection with the following detail description of the accompanying drawings, which show one exemplifying embodiment of the invention. After considering this example, skilled persons will understand that many variations may be made within the principles of the invention, and I contemplate the employment of any structures that are properly within the scope of the appended claims.

Fig. 1 is a view, partly in side elevation and partly in longitudinal section, of an appliance embodying the invention in one form.

Fig. 2 is a similar view but with all the lower part of the tool in longitudinal section, and with the jaws in a substantially wide-open or expanded position.

Fig. 3 is a section at 3—3, Fig. 1.

Fig. 4 is a section at 4—4, Fig. 2.

Fig. 5 is a perspective view of the lower or mandrel portion of the main stem or supporting body of the appliance.

Fig. 6 is a perspective view of one of the adjustable jaws or grippers with its body or supporting member.

Fig. 7 is a bottom plan view of Fig. 2.

The implement is arranged upon or around a main body or spindle 1, which may be a cylindrical bar of tool steel, properly shaped or machined for the present purpose. Any suitable handle, such as a cross-bar 2, is passed through a hole 3 in the upper end of the spindle. The handle may be arranged in any known or suitable way, for instance, it may be fixed or longitudinally slidable, and may, if desired, be provided with a curved end (not shown) so that it may be folded down alongside the tool without detachment, as usual in socket wrenches of certain types.

The lower portion of the body or spindle 1 is machined or otherwise formed to provide a jaw support or mandrel 5, best shown in perspective in Fig. 5. This mandrel comprises spaced rails or ribs 6 which have near their upper ends, radial extensions 7 formed with shoulders 8. At their lower ends the ribs have other radial extensions 9 reinforced or supported by a transverse circular flange 10 formed substantially at the end of the main body or spindle 1. The rib extensions 9 have oblique edge faces 11. Each of the main rails or ribs 6 is interrupted at a point somewhat below its mid-length, forming a recess or socket 12.

Co-operating with the mandrel is a plurality of jaw bodies 15, the number of these corresponding to the number of mandrel ribs 6. The bodies 15 are of curved or substantially arcuate form to provide for a rocking action. The inner face of each body is provided with a deep channel consisting of the portions 17 and 18, interrupted by a lug, or channel partition 19, which extends to the inner face of the jaw body. The channel portion 17 encloses the upper part of one of the mandrel ribs 6; the lug or partition 19 lies in the rib recess or socket 12, and channel portion 18 encloses the lower portion of the mandrel rib, as clearly shown in Fig. 2.

Near its lower end, each jaw body has an enlargement 25 and in the lower portion of this enlargement the jaw 26 is formed, each jaw having a suitable gripping face 27 to properly co-operate with a member to be gripped. In the present instance, since the tool is particularly designed as a socket wrench, the gripping face consists of two angularly arranged surfaces, designed to grip one corner of a hexagonal nut. Evidently the gripping surface may be differently designed or arranged to co-operate with other objects.

Adjacent to the jaw each gripper body has a transverse channel or recess 30 to accommodate the annular flange 10, and channel portion 18 is enlarged or cut outward through the upper portion of the enlargement 25 to accommodate rib extension 9. In the upper end of each jaw body is a slot 32 to accommodate rib extension 7.

A segmental screw thread 40 is cut, pressed or otherwise suitably formed on the outer arcuate face of each jaw body, the threads on all of the bodies being designed co-operatively to produce in effect a continuous screw thread; and because this thread is interrupted between each two adjacent jaw bodies, the thread need not necessarily be of true form but may be of modified or irregular form, suitable for the present purpose. Co-operating with the threaded or toothed jaw bodies is an adjusting sleeve or nut 45, provided on each end with a shallow internal flange 46 in each of which is formed a continuous short screw thread 47 designed to co-operate with the interrupted threads or teeth 40. The outer surface of the adjusting sleeve is usually roughened or knurled as indicated at 48.

The described structural features permit the use of any desired number of jaws within reasonable limits. Obviously two, three or four jaws might be used; but an important feature of the invention is that the described construction and arrangement permits the use of more than four jaws and conveniently, as many as six jaws, to properly co-operate with a hexagonal nut. Since there are very few nuts or any other objects arranged for co-operation with a wrench or chuck that have more than six faces, it will usually be unnecessary to provide more than six gripper bodies, but evidently this is possible if the occasion for it arises.

The appliance is assembled by placing the gripper bodies loosely in position on the mandrel and expanding the jaws somewhat beyond the position indicated in Fig. 2. The adjusting sleeve or nut 45 is then passed over the upper ends of the jaws and as soon as it reaches approximately the position shown in Fig. 2, the lower nut threads 46 will engage with the threads or teeth on the outer faces of the jaw bodies, and shortly thereafter, by rotary movement of the sleeve, the upper threads 46 will come in engagement with the jaw body threads or teeth, and thereafter the jaw bodies are positively held in position on the mandrel by the sleeve, and rotative movement of the sleeve effects adjustment of the jaws in an obvious way by a rocking movement of the jaws upon the mandrel. Figs. 1 and 3 sufficiently indicate a contracted position of the jaws, and Figs. 2, 4 and 7 sufficiently illustrate the open or expanded position of the jaws, and of course, they may be made to assume any intermediate position.

In all of their positions, the jaws are positively guided by the interfitting co-operation of ribs 6 with jaw body channels 17 and 18. Endwise displacement of the jaw bodies is prevented by engagement of the lugs 19 in sockets 12. Twisting movement of the jaws is further prevented by engagement of rib extensions 9 in the outward extensions of channels 18 and also by engagement of rib extensions 7 in slots 32. Evidently, therefore, the jaw bodies and jaws are positively held and guided, not only for true movement in adjustment, but so that they are well adapted to rigidly withstand the twisting strains incident to the use of the appliance as a wrench or as a tool chuck.

I claim:—

1. An adjustable gripping appliance comprising a main body having a mandrel portion, a plurality of jaw bodies of substantially arcuate form mounted in spaced relation on the mandrel, each jaw body being provided with a jaw projecting beyond the mandrel, the mandrel and jaw bodies being provided with interfitting ribs and channels admitting of rocking adjustment movement of the jaw bodies and taking twisting strain applied to the jaws, the jaw bodies having arcuate outer faces provided with teeth which co-operatively form a screw thread, and an adjusting sleeve having internal threads co-operating with the screw thread of the combined jaw bodies.

2. An adjustable gripping appliance comprising a main body having a mandrel portion, a plurality of jaw bodies of substantially arcuate form mounted in spaced relation on the mandrel, each jaw body being provided with a jaw projecting beyond the mandrel, the mandrel and jaw bodies being provided with interfitting ribs and channels admitting of rocking adjustment movement of the jaw bodies and taking twisting strain applied to the jaws, the mandrel and jaw bodies having co-operating means preventing longitudinal displacement of the jaw bodies, the jaw bodies having arcuate outer faces provided with teeth which co-operatively form a screw thread, and an adjusting sleeve having internal threads co-operating with the screw thread of the combined jaw bodies.

3. An adjustable gripping appliance comprising a main body having a mandrel portion, a plurality of jaw bodies of substantially arcuate form mounted in spaced relation on the mandrel, each jaw body being provided with a jaw projecting beyond the mandrel, the mandrel and jaw bodies being provided with interfitting ribs and channels admitting of rocking adjustment movement of the jaw bodies and taking twisting strain applied to the jaws, the ribs having radial extensions engaging in radial extensions of the channels to additionally brace and prevent displacement of the jaw bodies, the jaw bodies having arcuate outer faces provided with teeth which co-operatively form a screw thread, and an adjusting sleeve having internal threads co-operating with the screw thread of the combined jaw bodies.

4. An adjustable gripping appliance comprising a main body having a mandrel portion, a plurality of jaw bodies of substantially arcuate form mounted in spaced relation on the mandrel, each jaw body being provided with a jaw projecting beyond the mandrel, the mandrel and jaw bodies being provided with interfitting ribs and channels admitting of rocking adjustment movement of the jaw bodies and taking twisting strain applied to the jaws, the jaw bodies having slots in their upper ends and the mandrel being provided with radial members engaging in said slots to prevent twisting movement of the jaw bodies, the jaw bodies having arcuate outer faces provided with teeth which co-operatively form a screw thread, and an adjusting sleeve having internal threads co-operating with the screw thread of the combined jaw bodies.

5. An adjustable gripping appliance comprising a main body having a mandrel portion, a plurality of jaw bodies of substantially arcuate form mounted in spaced relation on the mandrel, each jaw body being provided with a jaw projecting beyond the mandrel, the mandrel having spaced radial ribs and the jaw bodies having on their inner faces longitudinal channels fitting about the ribs to prevent displacement of the jaw bodies and admit of rocking adjustment movement thereof, the jaw bodies having arcuate outer faces provided with teeth which co-operatively form a screw thread, and an adjusting sleeve having internal threads co-operating with the screw thread of the combined jaw body.

6. An adjustable gripping appliance comprising a main body having a mandrel portion, a plurality of jaw bodies of substantially arcuate form mounted in spaced relation on the mandrel, each jaw body being provided with a jaw projecting beyond the mandrel, the mandrel having spaced radial ribs and the jaw bodies having on their inner faces longitudinal channels fitting about the ribs to prevent displacement of the jaw bodies and admit of rocking adjustment movement thereof, the ribs being interrupted to provide sockets and the jaw bodies having members engaging in said sockets to prevent longitudinal displacement of the jaw bodies, the jaw bodies having arcuate outer faces provided with teeth which co-operatively form a screw thread, and an adjusting sleeve having internal threads co-operating with the screw thread of the combined jaw body.

7. An adjustable gripping appliance comprising a main body having a mandrel portion, a plurality of jaw bodies of substantially arcuate form mounted in spaced relation on the mandrel, each jaw body being provided with a jaw projecting beyond the mandrel, the mandrel having spaced radial ribs and the jaw bodies having on their inner faces longitudinal channels fitting about the ribs to prevent displacement of the jaw bodies and admit of rocking adjustment movement thereof, the mandrel being provided at its lower end with a cricular flange to reinforce said ribs and the jaw bodies being provided near the jaws with recesses to accommodate said flange, the jaw bodies having arcuate outer faces provided with teeth which co-operatively form a screw thread, and an adjusting sleeve having internal threads co-operating with the screw thread of the combined jaw body.

8. An adjustable gripping appliance comprising a main body having a mandrel portion, a plurality of jaw bodies of substantially arcuate form mounted in spaced relation on the mandrel, each jaw body being provided with a jaw projecting beyond the mandrel, the mandrel and jaw bodies being provided with interfitting ribs and channels admitting of rocking adjustment movement of the jaw bodies and taking twisting strain applied to the jaws, the jaw bodies having arcuate outer faces provided with teeth which co-operatively form a screw thread, and an adjusting sleeve having internal threads co-operating with the screw thread of the combined jaw bodies, said sleeve surrounding the jaw bodies and retaining them in position and serving when rotated to travel longitudinally and adjust the jaws by rocking movement of the jaw bodies.

9. An adjustable gripping appliance comprising a main body having a mandrel portion, a plurality of jaw bodies of substantially arcuate form mounted in spaced relation on the mandrel, each jaw body being provided with a jaw projecting beyond the mandrel, the mandrel and jaw bodies being provided with interfitting ribs and channels admitting of rocking adjustment movement of the jaw bodies and taking twisting strain applied to the jaws, the jaw bodies having arcuate outer faces provided with teeth which co-operatively form a screw thread, and an adjusting sleeve surrounding the jaw bodies and having an unthreaded central portion and internal screw threads extending a short distance inward from each end of the sleeve and engaging the screw thread of the combined jaw bodies to adjust the latter by rocking movement as the sleeve is rotated.

Signed at New York in the county of New York and State of New York this 26th day of April A. D. 1924.

EUGENE KOVARY.